US006908117B1

(12) United States Patent
Pickett, Jr. et al.

(10) Patent No.: US 6,908,117 B1
(45) Date of Patent: Jun. 21, 2005

(54) BLOCK-CONDUIT CONNECTION ALIGNMENT DEVICE

(75) Inventors: Paul Matthews Pickett, Jr., North Branch, MI (US); Daniel Shelton, Ortonville, MI (US)

(73) Assignee: Hutchinson FTS, Inc., Troy, MI (US)

(*) Notice: Subject to any disclaimer, the term of this patent is extended or adjusted under 35 U.S.C. 154(b) by 465 days.

(21) Appl. No.: 09/684,210

(22) Filed: Oct. 6, 2000

(51) Int. Cl.$^7$ ............................................. F16L 5/02
(52) U.S. Cl. ................ 285/137.11; 285/26; 285/142.1; 285/139.1; 285/205
(58) Field of Search .................... 285/205, 26, 137.11, 285/93, 139.1, 142.1

(56) References Cited

U.S. PATENT DOCUMENTS

| | | | |
|---|---|---|---|
| 1,409,606 A | * | 3/1922 | Stendahl ................ 411/353 |
| 4,448,447 A | | 5/1984 | Funk et al. |
| 4,575,132 A | | 3/1986 | Nattel |
| 4,626,006 A | | 12/1986 | Noguchi et al. |
| 4,640,535 A | | 2/1987 | Hermann |
| 4,672,728 A | | 6/1987 | Nimberger |
| 4,952,107 A | * | 8/1990 | Dupree .................. 411/103 |
| 5,163,716 A | | 11/1992 | Bolton et al. |
| 5,174,612 A | * | 12/1992 | Schnell ................... 285/49 |
| 5,213,378 A | | 5/1993 | MacGregor |
| 5,271,460 A | | 12/1993 | O'Brien |
| 5,333,917 A | | 8/1994 | Davey et al. |
| 5,363,910 A | | 11/1994 | Baba et al. |
| 5,387,014 A | | 2/1995 | Chevallier |
| 5,456,089 A | | 10/1995 | O'Brien |
| 5,477,919 A | | 12/1995 | Karube |
| 5,509,276 A | | 4/1996 | O'Brien |
| 5,526,605 A | | 6/1996 | O'Dougherty |
| 5,555,929 A | | 9/1996 | Ishikawa |
| 5,593,279 A | | 1/1997 | Hayashi |
| 5,603,152 A | | 2/1997 | Le et al. |
| 5,653,583 A | | 8/1997 | Hayashi et al. |
| 5,664,432 A | | 9/1997 | O'Brien |
| 5,711,370 A | | 1/1998 | Tanaka |
| 5,727,304 A | | 3/1998 | Eybergen |
| 5,810,558 A | | 9/1998 | Streeter |
| 5,829,794 A | | 11/1998 | Schulz-Hausmann et al. |
| 6,193,283 B1 | * | 2/2001 | Pickett, Jr. et al. ..... 285/137.11 |

* cited by examiner

Primary Examiner—David Bagnell
Assistant Examiner—Giovanna Collins
(74) Attorney, Agent, or Firm—VanOphem & VanOphem P.C.

(57) ABSTRACT

An alignment device for squarely aligning a conduit within a conduit port of a housing. The alignment device includes a connecting block having a conduit passage therethrough and into which the conduit is trapped. The connecting block has a fastener passage therethrough that is laterally offset from the conduit passage. A fastener is threaded into the housing and is offset from the conduit port. The fastener includes an alignment sleeve that mounts to a portion thereof. The connecting block mounts to the housing and the conduit fits into the conduit port, whereby the alignment sleeve pilots the fastener passage of the connecting block to squarely align the conduit within the conduit port.

16 Claims, 4 Drawing Sheets

BLOCK-CONDUIT CONNECTION ALIGNMENT DEVICE

BACKGROUND OF THE INVENTION

1. Field of the Invention

The present invention generally relates to a connecting block and conduit connection for vehicle air-conditioning systems. More specifically, this invention relates to a connecting block conduit connection, wherein an alignment element assures an efficient and reliable connection between a conduit connected to a housing of an air-conditioning component for a vehicle, in order to squarely align a relatively short conduit end within a conduit port of the housing.

2. Description of the Prior Art

Prior to the present invention, many types of sealing configurations have been proposed for connecting a conduit or tube to another component of a fluid system. Perhaps most common is the use of a simple O-ring encircling an end of a tube that is mounted into a port of a housing. The tube is connected to the port using a coaxial fastener that encircles and entraps the tube. The coaxial fastener is then screwed down over corresponding threads on the port—similar to a compression fitting—as is known in the art. Although this configuration is very simple and robust against leakage, its primary drawback is that it cannot be assembled quickly enough without damage to the O-ring for the modern-day assembly line. In order to torque the fastener to the port it is necessary to use hand tools, which is too time consuming. Therefore, devices such as block conduit connections were developed since they are easily assembled and quickly torqued down using a power tool.

The block conduit connection involves a connecting block typically having a teardrop-shaped profile. The connecting block entraps the conduit through a conduit passage therein. In addition, the connecting block houses a fastener through another passage just offset from and aligned parallel to the conduit passage. A simple bolt-style fastener is used to draw the connecting block and conduit into the port, such that the connection can be made quickly by torquing down the fastener with a power tool.

The block conduit connection, however, tends to be more susceptible to leakage than coaxial fastener connections and can present significant warranty problems to automobile manufacturers if not assembled properly. Leakage can occur in conditions where the connecting block and conduit are not properly aligned to the housing. In other words the mounting surfaces of the connecting block and housing are not parallel or flush, and the conduit is not squarely aligned within the port. Additionally, the fastener imparts a maximum hold down force along the axis of the fastener, but doesn't completely hold down the block at the end of the block opposite the fastener, and therefore cannot correct the misalignment condition. The misalignment condition normally leads to a pinched O-ring condition in which leakage is also likely to occur. Therefore, under high pressure conditions, fluid can leak out of the end of the block conduit connection at the end opposite the fastener, due to a pinched O-ring and/or misalignment and a lack of sufficient hold down force.

An example of such a defective block conduit connection 10P is illustrated in FIG. 1. For example, a conduit 50P and connecting block 30P are shown misaligned cross-axially relative to a conduit port 24P in a housing 20P. This misalignment is often due to incorrect assembly of the block conduit connection 10P. In other words, the longitudinal axis of a fastener 70P is not coaxially aligned with the conduit 50P. Torquing the fastener 70P results in a maximum hold-down force along the axis of the fastener 70P and a reduced hold-down force at the opposite end of the connecting block 30P at the far edge of the conduit 50P. Therefore, the connecting block 30P does not mount flush against the housing 20P and likewise, the conduit 50P does not mount squarely within, or misaligns cross-axially with respect to, the conduit port 24P. Cross-axial misalignment results in assembly defects such as cutting, pinching, or insufficient "squeeze" of an O-ring 58P as well as improper sealing of the O-ring 58P, thus permitting fluid to leak by. Therefore, it is important to ensure a square fit of the conduit 50P in the conduit port 24P and between the connecting block 30P and housing 20P. To be squarely aligned, the conduit 50P must be substantially at a right angle with respect to the mounting surface of the housing 20P.

To ensure a square fit between the connecting block 30P and the housing 20P, other block conduit connections 110P of the prior art provide for an extension pilot 56P on the end of the conduit 50P that pilots within a relatively long conduit port 24P, as shown in FIG. 2. The extension pilot 56P ensures straight and square alignment of the conduit 50P within the conduit port 24P of the housing 20P. Additionally, the tolerance stack up between the outer diameter of the extension pilot 56P and the inner diameter of the conduit port 24P is relatively tight to prevent misalignment therebetween. Accordingly, the result is a relatively long engagement length between the conduit 50P and conduit port 24P that enables square alignment therebetween. Unfortunately, the unnecessarily long engagement length and tight tolerances of these components is prohibitively expensive, uses extra material and weight, and consumes a large amount of space.

Therefore, what is needed is a device for a block conduit connection that requires a minimum of engagement length between the conduit end and the housing and ensures square alignment between the connecting block and conduit and the housing to reduce the potential for refrigerant leaks and therefore expensive damage to automotive air-conditioning equipment.

SUMMARY OF THE INVENTION

According to the present invention, there is provided a device for a block conduit connection that ensures square alignment between a connecting block, conduit, and a housing and requires only a minimum of engagement length between the conduit end and the housing. In the preferred embodiment of the present invention, an alignment device is provided for ensuring square alignment of a conduit within a conduit port of a housing. The alignment device includes a connecting block that has a conduit passage therethrough into which the conduit is trapped. The connecting block further includes a fastener passage therethrough that is laterally offset from the conduit passage. A fastener is threaded into a threaded port in the housing offset from the conduit port before the connection block is mounted to the housing. The fastener includes an alignment sleeve that is mounted within a relieved portion of the fastener. The connecting block fastener passage pilots on the alignment sleeve located on the fastener to provide a guide for the connecting block and associated conduit such that the conduit is guided into the conduit port to squarely align the conduit within the conduit port and avoid misalignment and any damage to the O-ring which may cause leakage.

Accordingly, it is an object of the present invention to provide an alignment device for a block conduit connection that enables a conduit to align squarely within a conduit port and enables use of standard tolerance stack-ups therebetween.

Another object of the present invention is to provide a conduit connection that requires a minimum engagement length between the conduit and the housing thereby reducing both the material and space required to accommodate the block conduit connection, thereby reducing material costs.

It is yet another object to provide a block conduit connection that will align properly every time, thereby reducing assembly down-time due to improper assembly, and thereby reducing warranty costs due to leakage.

These objects and other features, aspects, and advantages of this invention will be more apparent after a reading of the following detailed description, appended claims, and accompanying drawings.

DETAILED DESCRIPTION OF THE PREFERRED EMBODIMENT

In general, a block conduit connection is disclosed that incorporates an alignment device that permits square alignment between a conduit and a port in a housing. While the present invention will be described in detail with respect to fluid components, the alignment device is also well suited for use with other types of conduit where a seal is important.

Figure 3:
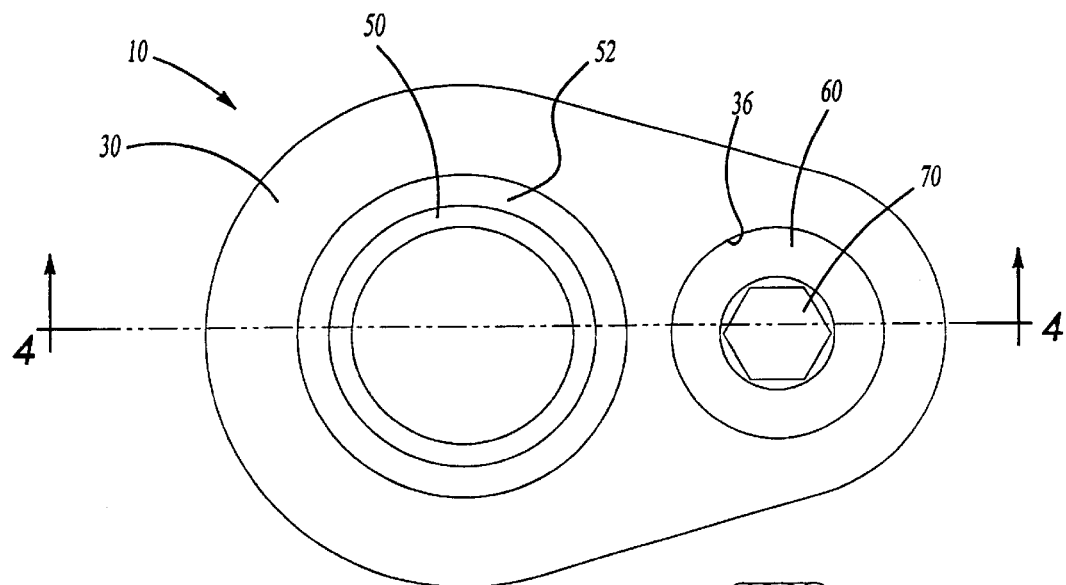
FIG. 3 is a top view of a block conduit connection according to the present invention.
Figure 4:
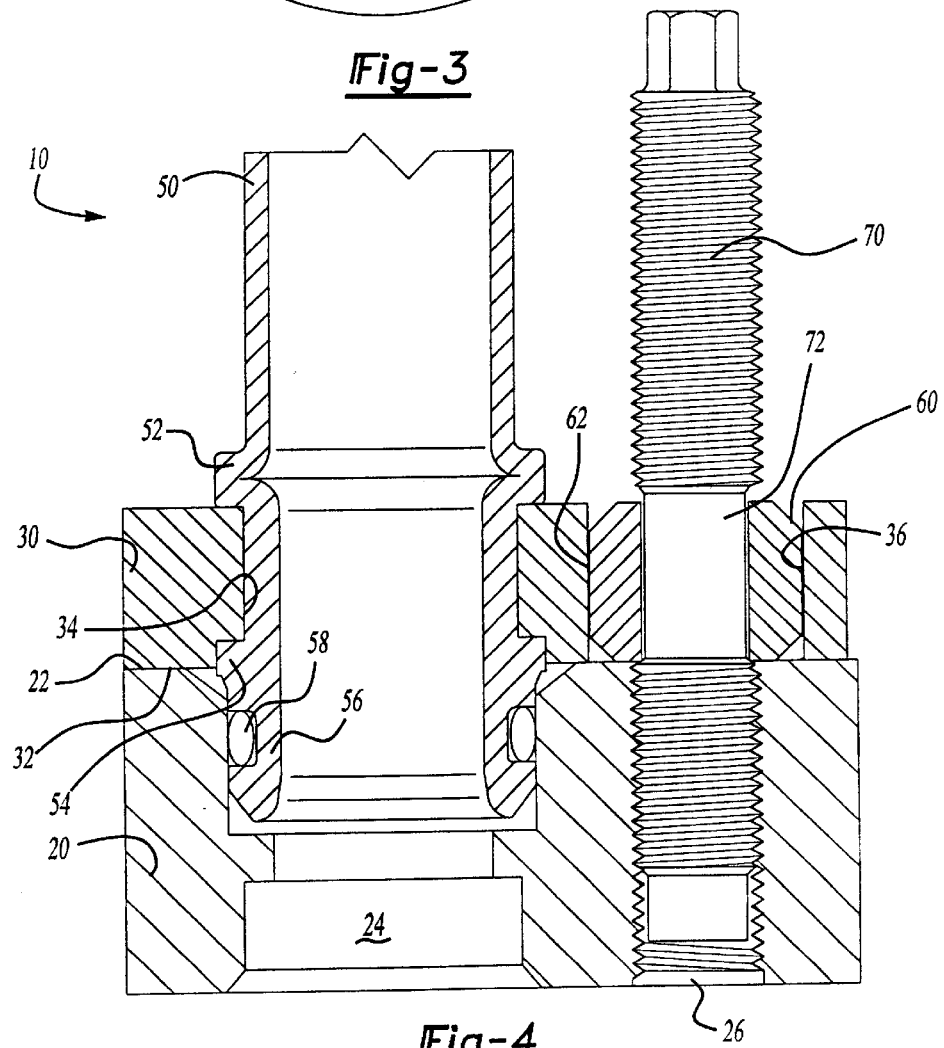
FIG. 4 is a cross sectional view of the block conduit connection of FIG. 3 taken along lines 4—4 thereof.

Referring now in detail to the Figures, and particularly to FIGS. 3 and 4, there is shown a novel block conduit connection 10 according to the present invention. As shown in FIG. 4, the block conduit connection 10 includes a housing 20 having a mounting surface 22 thereon and a conduit port 24 therein that is square, or at a right angle, to the mounting surface 22. Laterally offset from and substantially parallel to the conduit port 24 is a threaded fastener port 26. The housing 20 can be a portion of a refrigeration component such as a compressor, accumulator, or the like. The block conduit connection 10 further includes a connecting block 30 having a mounting surface 32 that mounts flush to the mounting surface 22 of the housing 20. The connecting block 30 further has a conduit passage 34 therethrough that is substantially square to the mounting surface 32 of the connecting block 30 and hence the mounting surface 22 of the housing 20. A fastener passage 36 is positioned laterally offset from and substantially parallel to the conduit passage 34. A conduit 50 is fastened to the connecting block 20 with annular upset beads 52 and 54. An end portion 56 of the conduit 50 is inserted into the conduit port 24 of the housing 20. An O-ring 58 seals the block conduit connection 10 so as to ensure fluid communication between the conduit 50 and conduit port 24, as is known in the art.

Previously unknown in the art, however, is the presently disclosed structure shown in FIG. 4 to ensure that the end portion 56 of the conduit 50 aligns correctly within the conduit port 24 to create a required seal and does not misalign with respect thereto. The fastener passage 36 of the connecting block 30 is piloted around an alignment sleeve 60 that in turn is mounted around a threaded stud 70. The threaded stud 70 is threaded into the threaded fastener port 26 of the housing 20 and its longitudinal axis is square with respect to the mounting surface 22 of the housing 20 and is parallel to the longitudinal axis of the conduit port 24. Preferably, the alignment sleeve 60 is trapped or interlocked within a recessed portion 72 of the threaded stud 70 to retain it thereto, and further may be press fit thereto. Also preferably, the alignment sleeve 60 is mounted flush against the mounting surface 22 of the housing 20 such that an outer diameter 62 of the alignment sleeve 60 is square with respect to the mounting surface 22. The alignment sleeve 60 engages the fastener passage 36 in line-to-line or locational clearance (LC) fit, to ensure that the longitudinal axis of the fastener passage 36 is coaxially aligned to the longitudinal axes of the alignment sleeve 60 and the threaded stud 70. Accordingly, the connecting block 30 mounts flush against the mounting surface 22 of the housing 20 and the conduit 50 mounts coaxially with respect to the conduit port 24 of the housing 20, to create an improved seal over the prior art.

Figure 1:
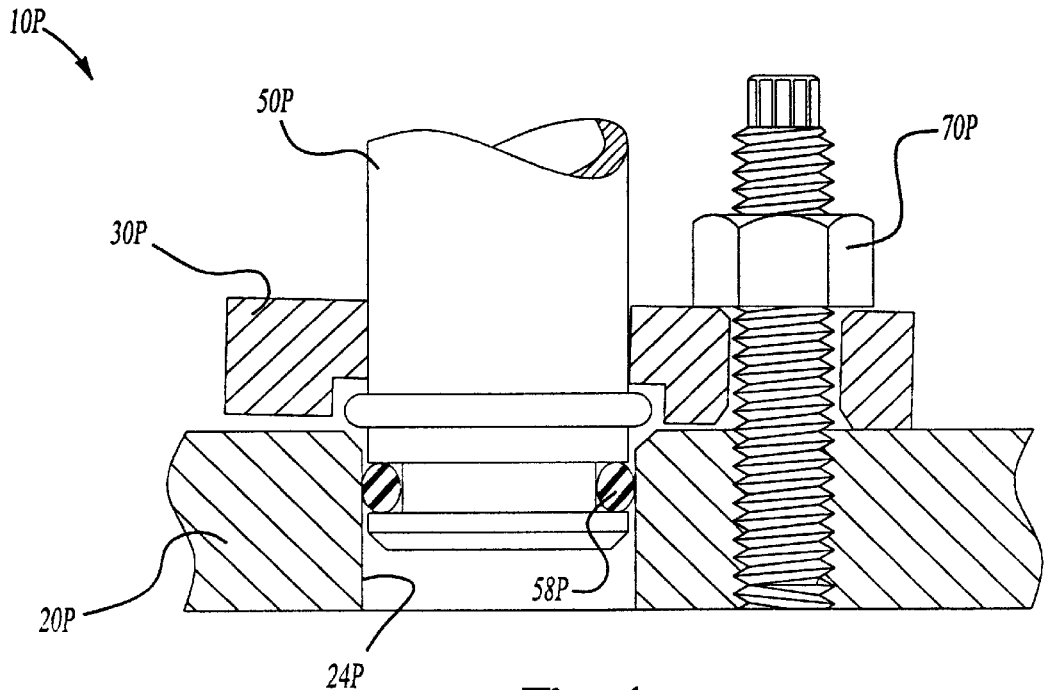
FIG. 1 is a partial cross section of an improperly assembled and misaligned block conduit connection according to the prior art.
Figure 2:
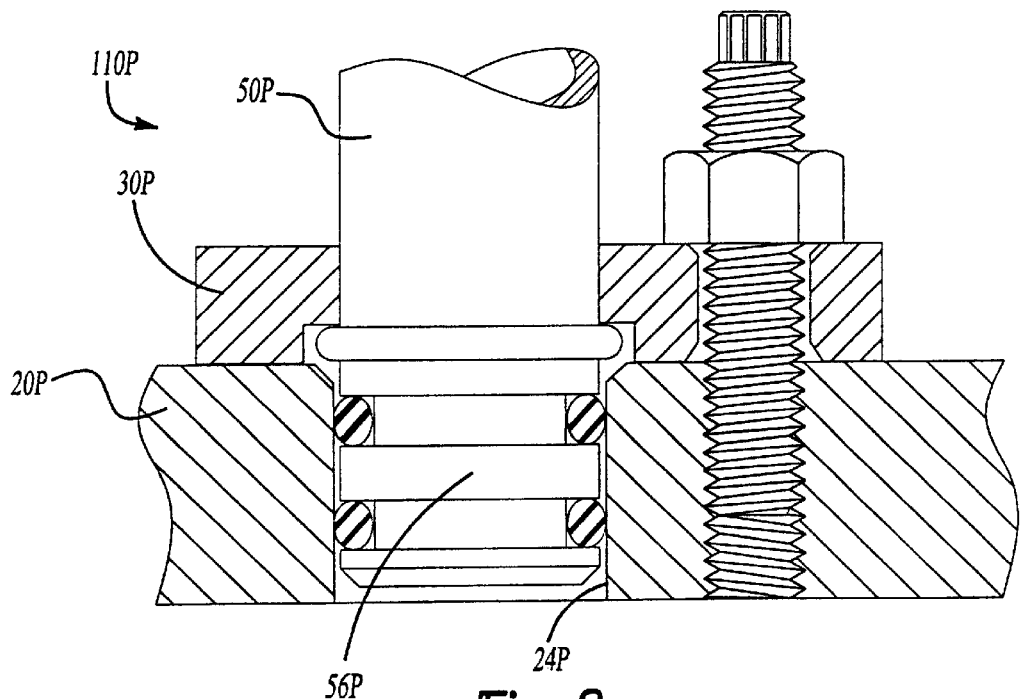
FIG. 2 is a partial cross section of another block conduit connection according to the prior art that has a relatively long engagement length between a conduit and a conduit port of a housing that is typically used to prevent misalignment of the components.

To assemble the block conduit connection 10, first the threaded stud 70 is threaded into the threaded fastener port 26 of the housing 20. The threaded stud 70 includes the alignment sleeve 60 that is mounted within the recessed portion 72 thereof. The connecting block 30 and conduit 50 are then assembled to the housing 20 by passing the fastener passage 36 over the threaded stud 70 while simultaneously fitting the conduit 50 into the conduit port 24, and then the alignment sleeve 60 pilots, or guides, the fastener passage 36 of the connecting block 30 to squarely align the conduit 50 within the conduit port 24. The fastener passage 36 engages the alignment sleeve 60 in a locational clearance (LC) fit to maintain the connecting block 30 in a squarely oriented relationship to the longitudinal axis of the threaded stud 70 so that the mounting surface 32 of the connecting block 30 will mount flat against the mounting surface 22 of the housing 20 and not misalign with respect thereto. Accordingly, the end portion 56 and O-ring 58 of the conduit 50 are correctly inserted into the conduit port 24 so the block conduit connection 10 can properly seal when in use. A flange nut (not shown) is then threaded to the threaded stud 70 to lock the connecting block 30 to the housing 20. The alignment sleeve 60 is preferably made of a resilient material such as nylon and achieves the same result as using the extension pilot 56P of FIG. 2, without the need for the additional costs associated with the increased length of the extension pilot 56P. Additionally, any other material could be used for the alignment sleeve 60.

Figure 5:
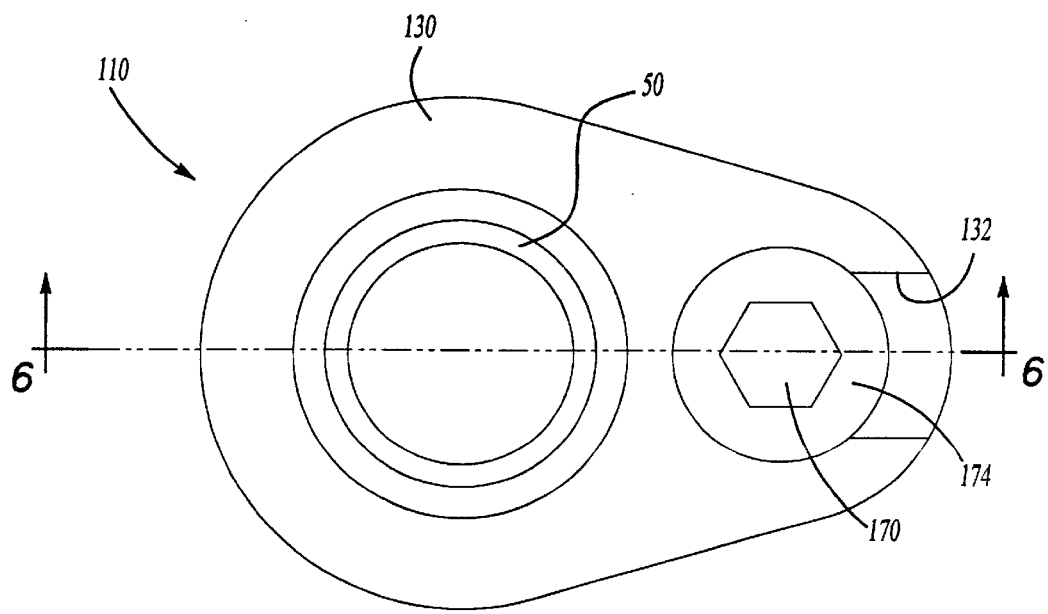
FIG. 5 is a top view of an alternate embodiment of a block conduit connection according to the present invention.
Figure 6:
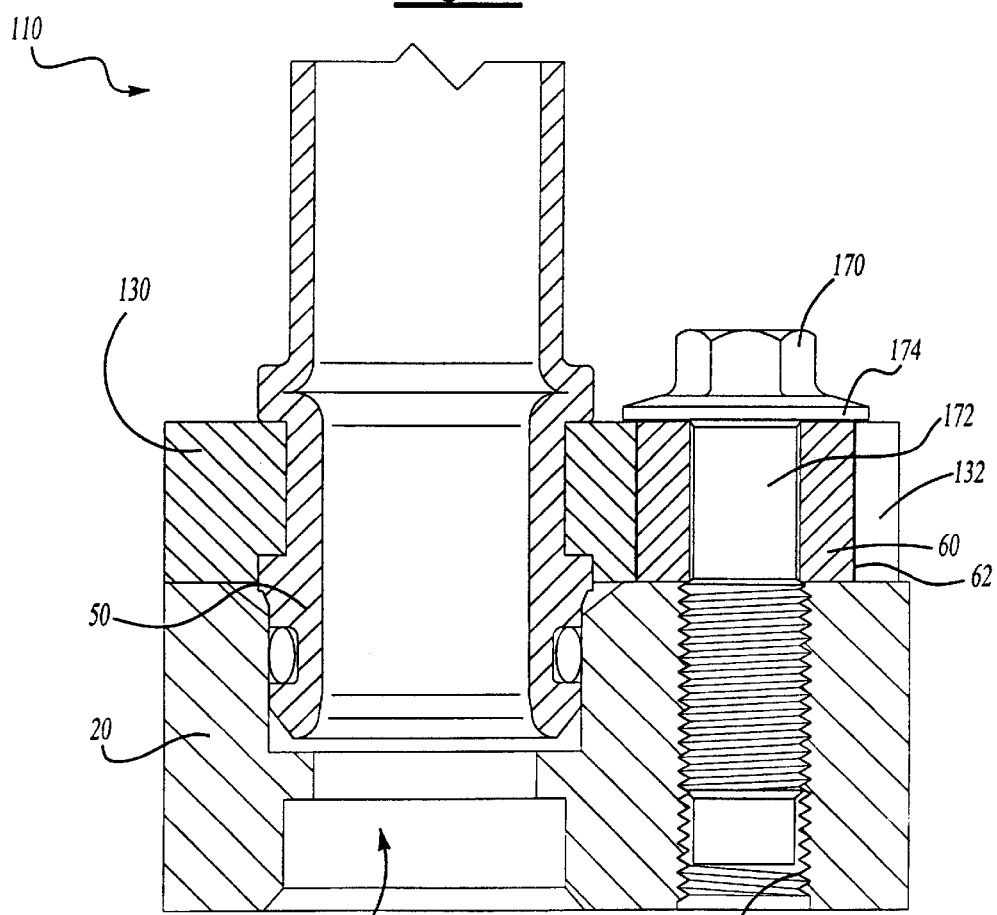
FIG. 6 is a cross sectional view of the block conduit connection of FIG. 5 taken along lines 6—6 thereof.

FIGS. 5 and 6 illustrate a block conduit connection 110 according to an alternative embodiment of the present invention that shares much of the same structure as the preferred embodiment of FIGS. 3 and 4. In contrast, however, a connecting block 130 has a slotted end 132 to enable sliding the connecting block 130 onto the alignment sleeve 60 that is trapped to a recessed portion 172 of a bolt 170. As shown in FIG. 6, the connecting block 130 can also be used to slide about a threaded stud like that used in FIG. 4. The slotted end 132 is sized nominally or slightly smaller than an outer diameter 62 of the alignment sleeve 60 to enable the connecting block 130 to pilot to the alignment sleeve 60 to mount squarely to the housing 20.

Still referring to FIG. 6, the block conduit connection 110 of this embodiment is assembled as follows. The bolt 170 is threaded into the threaded fastener port 26 of the housing 20 approximately half way. The connecting block 130 is thereafter assembled at an angle to the alignment sleeve 60 by introducing the slotted end 132 around the alignment sleeve 60 just below a flange 174 of the bolt 170 such that the slotted end 132 of the connecting block 130 straddles and pilots to the alignment sleeve 60. The connecting block 130 is then aligned to the housing 20 and the connecting block 130 is then pushed toward the housing 20 such that the slotted end 132 pilots around the alignment sleeve 60 to coaxially fit the conduit 50 into the conduit port 24. The bolt 170 is then torqued down against the connecting block 130 to secure the connecting block 130 to the housing 20.

Figure 7:
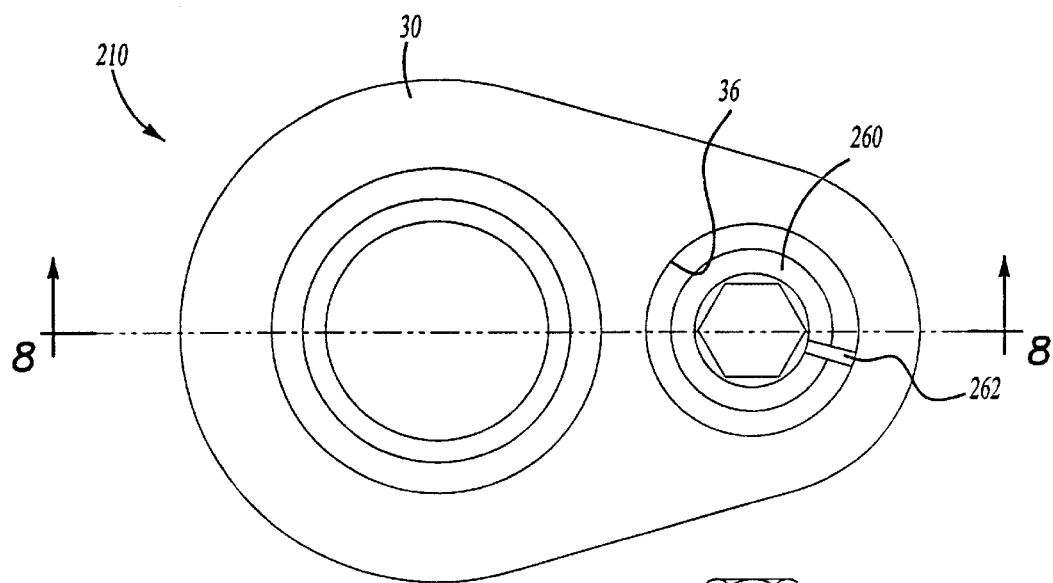
FIG. 7 is a top view of another embodiment of a block conduit connection according to the present invention.
Figure 8:
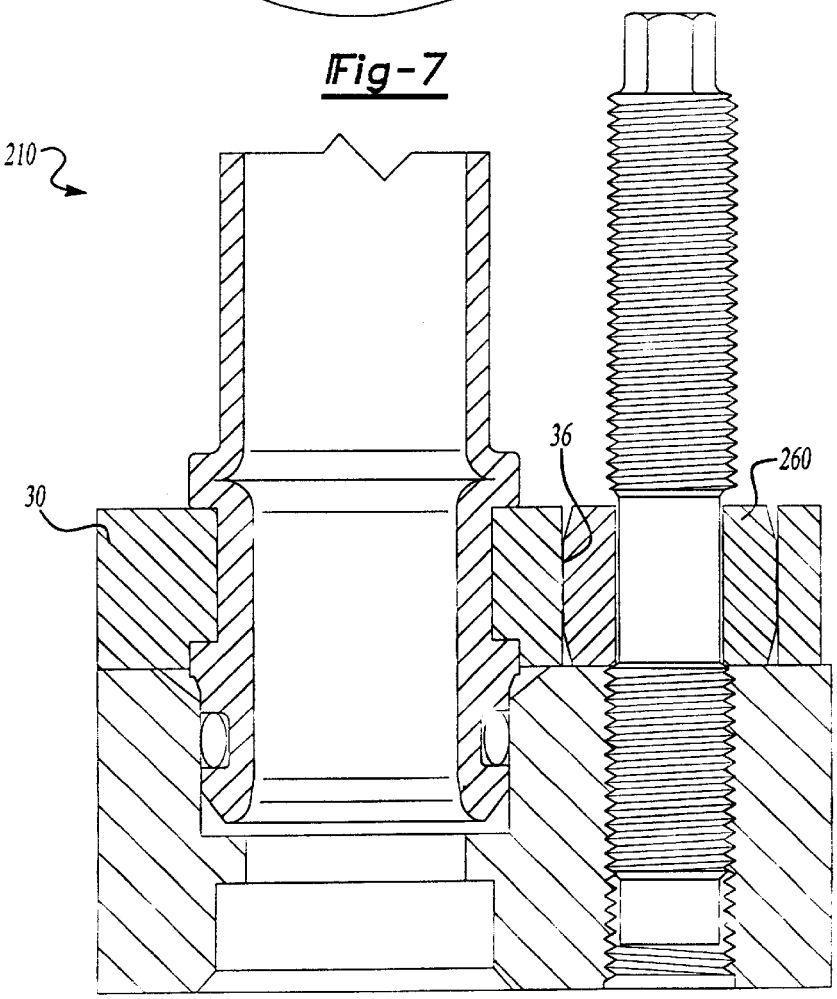
FIG. 8 is a cross-sectional view of the block conduit connection of FIG. 7 taken along lines 8—8 thereof.

FIGS. 7 and 8 illustrate a block conduit connection 210 according to another alternative embodiment of the present invention that is substantially similar to that of FIGS. 3 and 4. As shown in FIG. 7, however, a slotted alignment sleeve 260 is used that is slightly larger in outside diameter, in an unassembled state of rest, than the inside diameter of the fastener passage 36. The slotted alignment sleeve 260 has a slot 262 such that the slotted alignment sleeve 260 is open or C-shaped in a relaxed unassembled condition and provides a locational clearance (LC) fit with the fastener passage 36. As shown in FIG. 8, the connecting block 30 is pushed down towards the housing 20 such that the fastener passage 36 is guided over the alignment sleeve 260 whereby the alignment sleeve 260 pilots the fastener passage 36. Therefore, the alignment sleeve 260 is radially collapsible or displaceable yet cooperates with the fastener passage 36 in sliding interference to ensure easy assembly yet square alignment, as described previously.

From the above, it can be appreciated that a significant advantage of the present invention is that a conduit of a block conduit connection can now be more squarely aligned within a housing without pinching the O-ring. Thus, fluid leaks are less likely to occur and warranty cost savings are achieved.

An additional advantage is that the present invention eliminates the need to incorporate an extended length conduit end for squarely aligning a block conduit connection. Thus, the added expense and length associated with such prior art designs is eliminated.

While the present invention has been described in terms of a preferred embodiment, it is apparent that other forms could be adopted by one skilled in the art. Accordingly, the scope of the present invention is to be limited only by the following claims.

What is claimed is:

1. An alignment device for aligning a conduit within a conduit port of a housing, said alignment device comprising:
   a connecting block comprising a conduit passage and a fastener passage laterally offset from said conduit passage, said conduit being mounted in said conduit passage;
   a fastener having one end mounted into said fastener passage of said connecting block; and
   means for aligning said conduit in said conduit port of said housing, said means for aligning comprising an alignment sleeve interposed said connecting block and said fastener and secured to said fastener, whereby as said connecting block is mounted to said housing said conduit is mounted to said conduit port and said alignment sleeve pilots said fastener into said fastener passage of said connecting block to align said conduit axially within said conduit port.

2. The alignment device as claimed in claim 1, wherein said fastener comprises a bolt having a flange head, and further wherein said connecting block is slotted such that said fastener passage is open longitudinally and laterally, to enable easier assembly of said connecting block underneath said flange head of said bolt.

3. The alignment device as claimed in claim 1, wherein said alignment sleeve is chamfered to enable easier assembly of said connecting block thereover.

4. The alignment device as claimed in claim 1, wherein said alignment sleeve is slotted such that said alignment sleeve is substantially C-shaped and therefore radially collapsible to enable easier assembly of said connecting block thereover.

5. The alignment device as claimed in claim 1, wherein said fastener further comprises a recessed portion therearound, said alignment sleeve mounting around said recessed portion to interlock said alignment sleeve to said fastener.

6. The alignment device as claimed in claim 1, wherein said alignment sleeve is press-fit around said fastener.

7. The alignment device as claimed in claim 1, wherein said alignment sleeve is composed of a nylon material.

8. A conduit connection comprising:
   a housing having a conduit port and a fastener port laterally offset from said conduit port;
   a fastener disposed within said fastener port of said housing, said fastener having a recessed portion;
   an alignment sleeve mounting within said recessed portion of said fastener;
   a conduit having a conduit end at one end thereof, said conduit end adapted for insertion in said conduit port of said housing; and
   a connecting block mounted to said housing, said connecting block comprising a conduit passage therethrough circumscribing said conduit, said connecting block further comprising a fastener passage therethrough offset from said conduit passage, said fastener passage circumscribing said alignment sleeve, whereby said fastener passage of said connecting block is piloted by said alignment sleeve such that said alignment sleeve aligns said conduit axially within said conduit port.

9. The conduit connection as claimed in claim 8, wherein said fastener comprises a bolt having a flange head.

10. The conduit connection as claimed in claim 9, wherein said connecting block is slotted such that said fastener passage is open longitudinally and laterally, said slotted connecting block enabling easier assembly of said connecting block underneath said flange head of said bolt.

11. The conduit connection as claimed in claim 8, wherein said alignment sleeve is chamfered to enable easier assembly of said connecting block thereover.

12. The conduit connection as claimed in claim 8, wherein said alignment sleeve is slotted such that said alignment sleeve is substantially C-shaped and radially collapsible to enable easier assembly of said connecting block thereover.

13. The conduit connection as claimed in claim 8, wherein said fastener further comprises a recessed portion therearound, said alignment sleeve mounting around said recessed portion to interlock said alignment sleeve to said fastener.

14. The conduit connection as claimed in claim 8, wherein said alignment sleeve is press-fit around said fastener.

15. The conduit connection as claimed in claim 8, wherein said alignment sleeve is composed of a nylon material.

16. A method for connecting and aligning a conduit within a conduit port of a housing, said method comprising the steps of:

providing a connecting block having a conduit passage and a fastener passage laterally offset from said conduit passage;

providing a housing having a fastener port offset from a conduit port;

providing a fastener for mounting to said fastener port;

placing an alignment sleeve on said fastener;

releasably securing said fastener within said fastener port of said housing; and mounting said fastener passage of said connecting block over said alignment sleeve such that said alignment sleeve pilots said fastener passage of said connecting block to axially align said conduit within said conduit port.

\* \* \* \* \*